(12) United States Patent
Jin et al.

(10) Patent No.: US 11,086,772 B2
(45) Date of Patent: Aug. 10, 2021

(54) MEMORY SYSTEM PERFORMING GARBAGE COLLECTION OPERATION AND OPERATING METHOD OF MEMORY SYSTEM

(71) Applicant: SK hynix Inc., Gyeonggi-do (KR)

(72) Inventors: Yong Jin, Seoul (KR); Du Yeong Roh, Gyeonggi-do (KR); Dong Ju Lee, Seoul (KR); Tae Jin Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/224,955

(22) Filed: Dec. 19, 2018

(65) Prior Publication Data

US 2020/0089603 A1 Mar. 19, 2020

(30) Foreign Application Priority Data

Sep. 18, 2018 (KR) ........................ 10-2018-0111661

(51) Int. Cl.
*G06F 12/02* (2006.01)
*G06F 3/06* (2006.01)
*G06F 11/14* (2006.01)

(52) U.S. Cl.
CPC .......... *G06F 12/0246* (2013.01); *G06F 3/061* (2013.01); *G06F 3/064* (2013.01); *G06F 3/0647* (2013.01); *G06F 3/0679* (2013.01); *G06F 2212/1008* (2013.01); *G06F 2212/1016* (2013.01); *G06F 2212/2022* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 2011/0022778 A1* | 1/2011 | Schibilla | G06F 12/0246 711/103 |
| 2011/0055455 A1* | 3/2011 | Post | G06F 12/0246 711/103 |
| 2016/0306553 A1* | 10/2016 | Ellis | G06F 3/0611 |
| 2017/0286286 A1* | 10/2017 | Szubbocsev | G06F 3/0679 |
| 2018/0307419 A1* | 10/2018 | Takeda | G06F 3/0616 |
| 2018/0307615 A1* | 10/2018 | Takeda | G06F 3/0688 |
| 2018/0357159 A1* | 12/2018 | Parker | G06F 3/0688 |

FOREIGN PATENT DOCUMENTS

KR 1020170003776 1/2017

* cited by examiner

*Primary Examiner* — Michael Alsip
(74) *Attorney, Agent, or Firm* — IP & T Group LLP (57) ABSTRACT

Provided is an operating method of a memory system including a plurality of logical address groups each having a preset logical address range. The operation method may include: selecting a victim block; selecting a plurality of target blocks among empty blocks; mapping at least one logical address group of the logical address groups to each of the target blocks; determining a first logical address group including a logical address of first valid data stored in the victim block, among the logical address groups; and backing up the first valid data into a first target block mapped to the first logical address group among the target blocks.

15 Claims, 9 Drawing Sheets

| Logical Address Group (LAG) | Logical Address Range |
|---|---|
| LAG0 | LA0 ~ LA499 |
| LAG1 | LA500 ~ LA749 |
| LAG2 | LA750 ~ LA999 |
| LAG3 | LA1000 ~ LA1999 |

FIG.3B

MPT

| Physical Address (PA) | | Logical Address (LA) | Logical Address Group (LAG) |
|---|---|---|---|
| ADD_Blk | ADD_PG | | |
| 0 | 0 | LA400 | LAG0 |
| 0 | 1 | LA401 | LAG0 |
| 0 | 2 | LA402 | LAG0 |
| 0 | 3 | LA0 | LAG0 |
| 1 | 0 | LA1000 | LAG3 |
| 1 | 1 | LA1001 | LAG3 |
| 1 | 2 | LA800 | LAG2 |
| 1 | 3 | LA801 | LAG2 |

MEMORY SYSTEM PERFORMING GARBAGE COLLECTION OPERATION AND OPERATING METHOD OF MEMORY SYSTEM

CROSS-REFERENCES TO RELATED APPLICATION

The present application claims priority under 35 U.S.C. § 119(a) to Korean application number 10-2018-0111661, filed on Sep. 18, 2018, in the Korean Intellectual Property Office, which is incorporated herein by reference in its entirety.

BACKGROUND

1. Technical Field

Various embodiments of the present disclosure generally relate to a memory system. Particularly, the embodiments relate to a memory system including a nonvolatile memory device.

2. Related Art

A memory system may be configured to store data provided from an external device, in response to a write request of the external device. Also, the memory system may be configured to provide data stored therein to the external device, in response to a read request of the external device. The external device may include a computer, digital camera, mobile phone or the like, as an electronic device capable of processing data. The memory system may be embedded in the external device or separately fabricated and connected to the external device.

Since the memory system using a memory device has no mechanical driver, the memory system has excellent stability and durability, exhibits high information access speed, and has low power consumption. Examples of the memory system having such advantages may include a universal serial bus (USB) memory device, a memory card having various interfaces, a universal flash storage (UFS) device, and a solid state drive (SSD).

SUMMARY

In an embodiment, there is provided an operating method of a memory system including a plurality of logical address groups each having a preset logical address range. The operation method may include: selecting a victim block; selecting a plurality of target blocks among empty blocks; mapping at least one logical address group of the logical address groups to each of the target blocks; determining a first logical address group including a logical address of first valid data stored in the victim block, among the logical address groups; and backing up the first valid data into a first target block mapped to the first logical address group among the target blocks.

In an embodiment, there is provided an operating method of a memory system including a plurality of logical address groups each having a preset logical address range. The operation method may include: selecting a victim block; selecting a target block into which valid data stored in the victim block is to be backed up, among empty blocks; deciding a backup order of the logical address groups, the backup order indicating an order that valid data corresponding to the respective logical address groups are backed up into the target block; and backing up valid data selected from the valid data based on the backup order, into the target block.

In an embodiment, there is provided a memory system. The memory system may include: a plurality of nonvolatile memory devices each including a plurality of memory blocks represented by a plurality of logical address groups each having a preset logical address range; and a controller configured to group the memory blocks into a plurality of super blocks across the nonvolatile memory devices, select a victim super block among the super blocks, and control an internal backup operation for the victim super block, wherein the controller further determines logical address groups including logical addresses of valid data stored in the victim super block among the logical address groups, and backs up the valid data into positions mapped to the determined logical address groups.

In an embodiment, there is provided a memory system. The memory system may include: a memory device including one or more target blocks, and one or more victim blocks each corresponding to one or more logical address groups; and a controller configured to control the memory device to gather, into one among the target blocks, valid data stored the victim memory blocks corresponding to one among the logical address groups.

DETAILED DESCRIPTION

The advantages and characteristics of the present disclosure and a method for achieving the advantages and characteristics will be described through the following embodiments with reference to the accompanying drawings. However, the present disclosure is not limited to the embodiments described herein, but may be embodied in different manners. The present embodiments are only provided to describe the present disclosure in detail, such that the technical idea of the present disclosure can be easily carried out by those skilled in the art to which the present disclosure pertains.

It is noted that reference to "an embodiment" does not necessarily mean only one embodiment, and different references to "an embodiment" are not necessarily to the same embodiment(s).

The present embodiments are not limited to specific shapes illustrated in the drawings, but may be exaggerated for clarity. In this specification, specific terms are used. However, the terms are only used to describe the present disclosure, and do not limit the scope of the present disclosure, described in claims.

In this specification, an expression such as 'and/or' may indicate including one or more of components listed before/after the expression. Moreover, an expression such as 'connected/coupled' may indicate that one element is directly connected/coupled to another element or indirectly connected/coupled to another element through still another element. The terms of a singular form may include plural forms unless referred to the contrary. Furthermore, the meanings of 'include' and 'comprise' or 'including' and 'comprising' may specify a component, step, operation and element, and do not exclude the presence or addition of one or more other components, steps, operations and elements.

Hereafter, exemplary embodiments will be described in detail with reference to the accompanying drawings.

Figure 1:
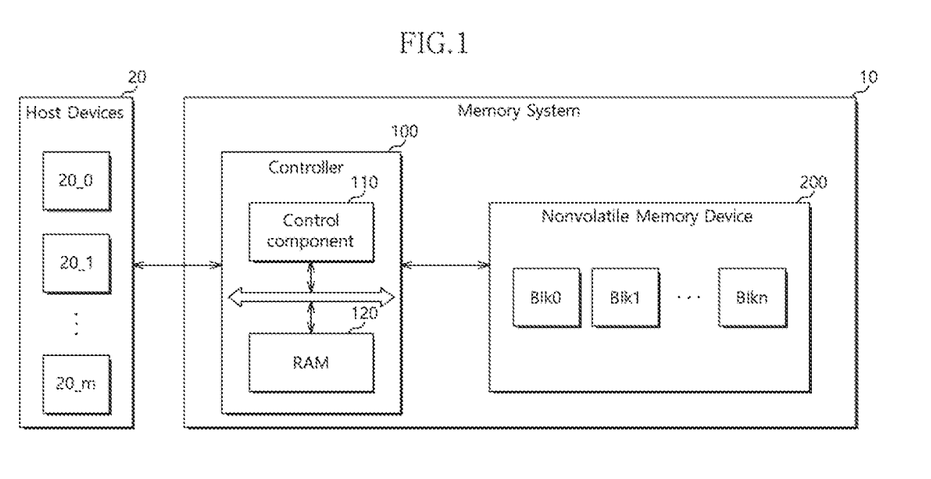
FIG. 1 is a block diagram illustrating the configuration of a memory system in accordance with an embodiment.

FIG. 1 is a block diagram illustrating the configuration of a memory system 10 in accordance with an embodiment.

The memory system 10 may store data accessed by a host device such as a mobile phone, MP3 player, laptop computer, desktop computer, game machine, TV or in-vehicle infotainment system.

The memory system 10 may be fabricated as any one of various types of storage devices, according to a host interface indicating a transfer protocol with the host device. For example, the memory system 10 may be configured as any one of various types of storage devices which include a multimedia card such as an SSD, MMC, eMMC, RS-MMC or micro-MMC, a secure digital card such as an SD, mini-SD or micro-SD, a universal storage bus (USB) storage device, a universal flash storage (UFS) device, a personal computer memory card international association (PCMCIA) card-type storage device, a peripheral component interconnection (PIC) card-type storage device, a PCI express (PCI-E) card-type storage device, a compact flash (CF) card, a smart media card and a memory stick.

The memory system 10 may be fabricated as any one of various types of packages. For example, the memory system 10 may be fabricated as any one of various types of packages such as a package on package (POP), a system in package (SIP), a system on chip (SOC), a multi-chip package (MCP), a chip-on-board (COB) package, a wafer-level fabricated package (WFP) and a wafer-level stack package (WSP).

The memory system 10 may include a controller 100 and a nonvolatile memory device 200. The controller 100 may include a control component 110 and a random access memory (RAM) 120.

The control component 110 may include a micro control unit (MCU) and a central processing unit (CPU). The control component 110 may process a request transferred from the host device. In order to process the request, the control component 110 may drive a code-based instruction or algorithm loaded to the RAM 120, i.e. firmware FW, and control internal function blocks and the nonvolatile memory device 200.

The RAM 120 may be configured as a dynamic RAM (DRAM) or static RAM (SRAM). The RAM 120 may store firmware FW driven by the control component 110. Furthermore, the RAM 120 may data required for driving the firmware FW, for example, meta data. That is, the RAM 120 may operate as a working memory of the control component 110.

By way of example and not limitation, the nonvolatile memory device 200 may be configured as any one of various types of nonvolatile memory devices including a NAND flash memory device, a NOR flash memory device, a ferroelectric RAM (FRAM) using a ferroelectric capacitor, a magnetic RAM (MRAM) using a tunneling magneto-resistive (TMR) film, a phase change RAM (PCRAM) using chalcogenide alloys, and a resistive RAM (RERAM) using transition metal oxide.

Figure 15:
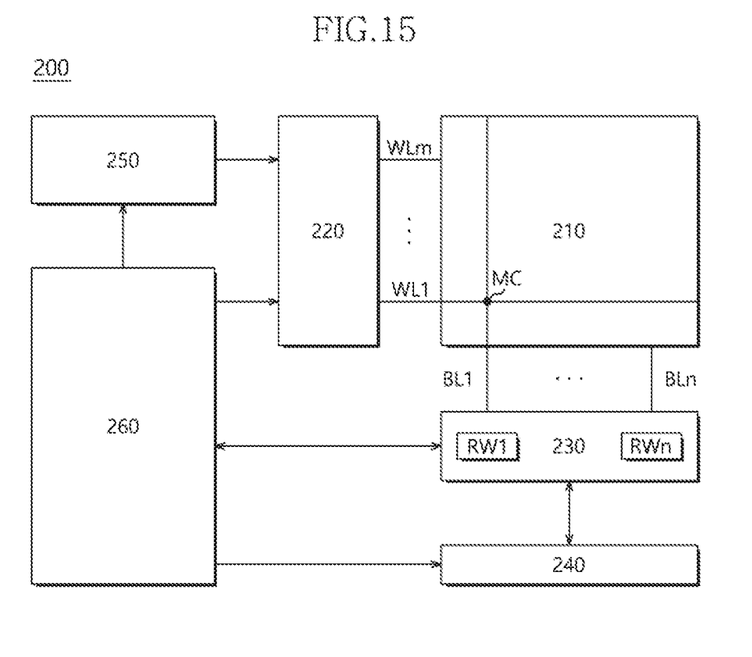
FIG. 15 is a block diagram illustrating a nonvolatile memory device included in a memory system in accordance with an embodiment.

The nonvolatile memory device 200 may include a memory cell array, such as a memory cell 210 of FIG. 15. Memory cells included in the memory cell array may be configured on a hierarchical memory cell group or memory cell basis, from an operational point of view or a physical or structural point of view. For example, memory cells coupled to the same word line and read/written or programmed at the same time may be configured as a page. Hereafter, for convenience of description, memory cells configured as a page will be referred to as "page". Furthermore, memory cells deleted at the same time may be configured as a memory block. The memory cell array may include a plurality of memory blocks, and each of the memory blocks may include a plurality of pages. This specification is based on the supposition that each of the memory blocks Blk0 to Blkn includes four pages as an example.

The controller 100 may control the nonvolatile memory device 200 to perform an operation corresponding to a request of the host device. Specifically, the controller 100 may generate a command corresponding to the request, transfer the generated command to the nonvolatile memory device 200, and control the nonvolatile memory device 200 to perform the corresponding operation. The operation corresponding to the request may include a data write operation, a data read operation and the like.

In an embodiment, a plurality of host devices 20_0 to 20_m may share the memory system 10. The host devices 20_0 to 20_m may be physically or logically separated from one another depending on the characteristics of workloads thereof. The plurality of host devices 20_0 to 20_m may have workloads of different characteristics. Storage space within the memory system 10 may be logically divided for the respective host devices 20_0 to 20_m.

For example, a majority of data which are stored in the nonvolatile memory device 200 in response to requests outputted from the host device 20_0 may correspond to read requests while a majority of data which are stored in the nonvolatile memory device 200 in response to requests outputted from the host device 20_1 may correspond to write requests. In this case, the data corresponding to the host device 20_1 may be updated more frequently. When the plurality of host devices 20_0 to 20_m having different workload characteristics use one memory system 10, the data stored therein or the memory blocks in which the data are stored need to be separately managed.

Figure 2:
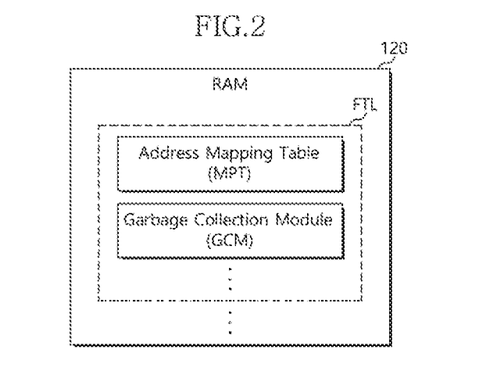
FIG. 2 is a diagram for describing software driven in a random access memory (RAM) of FIG. 1.

FIG. 2 is a diagram for describing software which is driven in a random access memory (RAM) of FIG. 1. Referring to FIGS. 1 and 2, an example in which a flash translation layer (FTL) is driven will be described.

As described above, the control component 110 may control an erase operation on a memory block by block basis, and control a read or program operation on a page by page basis. Since the nonvolatile memory device 200 cannot overwrite data, the control component 110 may preferentially perform an erase operation to store new data in a memory cell having data stored therein.

The control component 110 may drive firmware or software referred to as the FTL, in order to control such a unique operation of the nonvolatile memory device 200 and to provide device compatibility to the host devices 20. As the FTL is driven, a data storage device may be recognized as a general data storage device such as a hard disk by the host devices 20.

The FTL loaded to the RAM 120 may include modules for performing various functions and meta data required for driving the modules. For example, with reference to FIG. 2, the FTL may include an address mapping table MPT, a garbage collection module GCM, a wear-leveling module (not illustrated), a bad block management module (not illustrated) and the like.

When the host devices 20 access the data storage device (for example, when the host devices 20 request a read or write operation), the host devices 20 may provide a logical address to the data storage device. The FTL may translate the provided logical address into a physical address of the nonvolatile memory device 200, and perform the requested operation by referring to the translated physical address. For such an address translation operation, address translation data, i.e. the address mapping table MPT, may be included in the FTL.

The garbage collection module GCM may manage memory blocks in which fragmented data are stored. As described above, the nonvolatile memory device 200 cannot overwrite data, and the program unit may be larger than the erase unit. For this reason, the nonvolatile memory device 200 may need an operation of collecting valid data distributed at physically different positions in one space, when the storage space thereof approaches a predetermined limit. The garbage collection module GCM may perform an operation of collecting fragmented valid data in a collection region by performing a plurality of write operations and a plurality of erase operations. A process of performing the garbage collection operation for collecting valid data in accordance with the present embodiment will be described in detail with reference to FIGS. 4 to 9B.

The wear-leveling module may manage the wear levels of the pages or memory blocks of the nonvolatile memory device 200. The program and erase operations may age memory cells of the nonvolatile memory device 200. The aged memory cells, that is, worn memory cells may cause a defect. In order to prevent a specific memory block from being worn faster than the other memory blocks, the wear-leveling module may manage the memory blocks to have a standardized program-erase count.

The bad block management module may manage a memory block having a defect among the memory blocks of the nonvolatile memory device 200. As described above, a defect may occur in a worn memory cell. Data stored in a memory cell in which a defect occurred cannot be normally read. Also, data may not be normally stored in the memory cell in which the defect occurred. The bad block management module may manage a memory block including the memory cell in which the defect occurred, such that the memory block is not used.

Figure 3A:
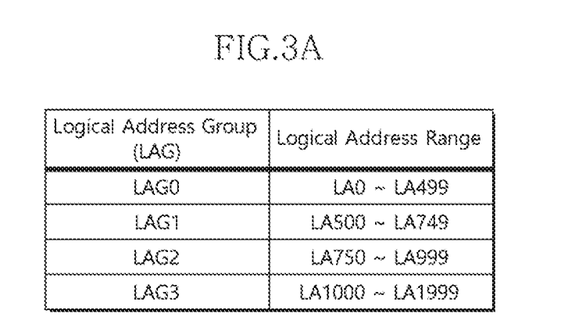
FIG. 3A is a diagram for describing logical address (LA) ranges included in logical address groups (LAG), respectively.

FIG. 3A illustrates logical address (LA) ranges included in logical address groups (LAG), respectively. Hereafter, referring to FIGS. 1 and 3, an example of a name space applied to the memory system 10 will be described.

Multiple paths and virtualization of a memory system serves an important role for a plurality of host devices to share the storage space within the memory system. The multiple paths and virtualization may enable the hose devices to access data stored in the memory system, if necessary.

The memory system 10 in accordance with the present embodiment may support a name space function. Here, "name space" may be defined as a quantity of the storage space within the nonvolatile memory device 200. The name space may be configured by logical blocks. A plurality of name spaces may respectively correspond to different logical address groups LAG, and the logical address groups LAG may respectively have different logical address (LA) ranges each representing a collection of logical blocks. "Name space function" may indicate a function of providing a plurality of logical storage spaces from one physical storage space. Specifically, the name space function may indicate a technique that divides a single physical storage space of the memory system 10 into a plurality of name spaces (i.e., a plurality of logical storage spaces), and assigns unique logical addresses to the respective name spaces.

In an embodiment, the memory system 10 may manage a multi-name space. Thus, the memory system 10 may be referred to as providing a multi-name space function. Specifically, the memory system 10 may dynamically generate a plurality of name spaces respectively corresponding to a plurality of logical address groups, and dynamically delete some of the generated name spaces. For example, the memory system 10 may include a nonvolatile memory express stolid state drive (NVMe SSD). In the present description, the plurality of logical address groups LAG0 to LAG3 may indicate a multi-name space.

As illustrated in FIG. 3A, the memory system 10 may manage four logical address groups LAG0 to LAG3. The logical address groups LAG0 to LAG3 may include different logical address ranges. For example, the logical address group LAG0 may include a logical address range from a logical address LA0 to a logical address LA499. The logical address group LAG1 may include a logical address range from a logical address LA500 to a logical address LA749. The logical address group LAG2 may include a logical address range from a logical address LA750 to a logical address LA999. The logical address group LAG3 may include a logical address range from a logical address LA1000 to a logical address LA1999. That is, the logical address groups LAG0 to LAG3 may include 500, 250, 250 and 1000 logical addresses, respectively. The logical address range of each of the logical address groups LAG0 to LAG3 may be variably set depending on the workload characteristics of the host devices 20_0 to 20_m.

Figure 3B:
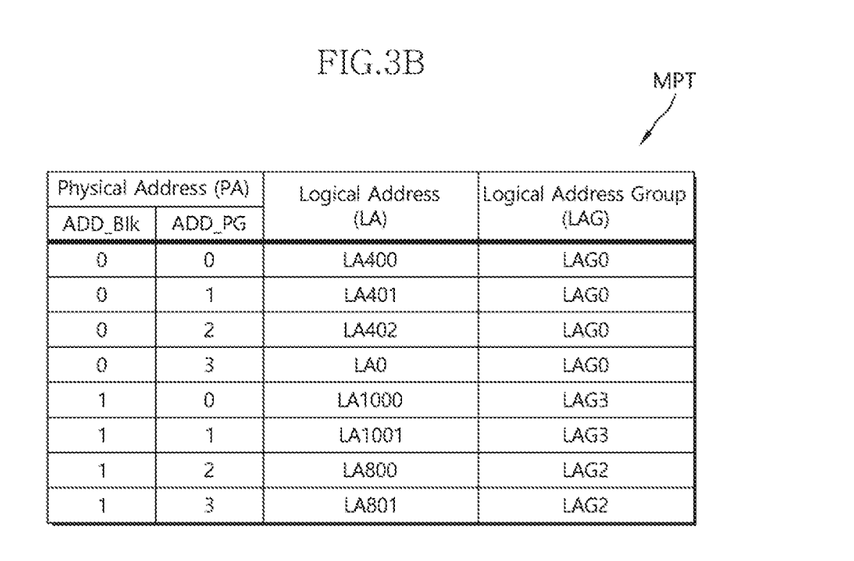
FIG. 3B is a diagram for describing information stored in a mapping table.

FIG. 3B is a diagram for describing information stored in a mapping table MPT.

As described above, the FTL may translate a provided logical address into a physical address of the nonvolatile memory device 200, and perform a requested operation by referring to the translated physical address. For such an address translation operation, address translation data, i.e. the address mapping table MPT, may be included in the FTL.

In an embodiment, the mapping table MPT may include information on physical addresses PA, logical addresses LA and logical address groups LAG. Each of the physical addresses PA may include a block address ADD_Blk and a page address ADD_PG. FIG. 3B illustrates logical addresses LA and logical address groups LAG which correspond to a memory block Blk0 having a block address ADD_Blk of 0 and a memory block Blk1 having a block address ADD_Blk of 1.

The mapping table MPT may store information indicating that data corresponding to logical addresses LA of 400 to 402 are stored in pages having page addresses ADD_PG of 0 to 2 in the memory block Blk0, and information on a logical address group LAG0 including the logical addresses LA of 400 to 402. The mapping table MPT may store information indicating that data corresponding to a logical address LA of 0 are stored in a page having a page address ADD_PG of 3 in the memory block Blk0, and information on a logical address group LAG0 including the logical address LA of 0. Similarly, the mapping table MPT may store information indicating that data corresponding to logical addresses LA of 1000, 1001, 800 and 801 are stored in pages having page addresses ADD_PG of 0 to 3 in the memory block Blk1, and information on logical address groups LAG3 and LAG2 corresponding to the respective pages.

Although not illustrated, in an embodiment, the mapping table MPT may further store information on whether data stored in the nonvolatile memory device 200 are valid data or invalid data. For example, the mapping table MPT may include information on whether data stored in a page of the page address ADD_PG of 0 in the memory block Blk0, is valid data (i.e. the last updated data) or invalid data. When the data stored in a particular page is invalid, new or updated version of that data may be stored in another page. The particular page and the another page (i.e., the different physical storage areas of that data) may correspond to the same logical storage area represented by the same logical address.

In an embodiment, the controller 100 may determine whether data is valid data or invalid data, by referring to the mapping table MPT. For example, the controller 100 may determine whether data having the same logical address as requested data is stored in another region of the nonvolatile memory device 200, by referring to the mapping table MPT. Based on the determination result, the controller 100 may determine whether the data stored in the corresponding region is valid data or invalid data.

Figure 4:
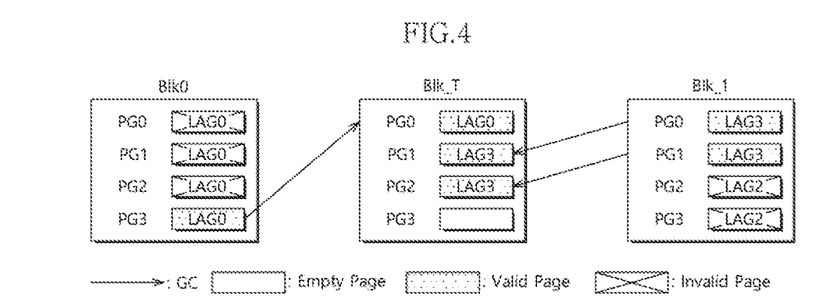
FIG. 4 is a diagram for describing a garbage collection operation performed by a garbage collection module of FIG. 2.

FIG. 4 is a diagram for describing a garbage collection operation performed by the garbage collection module of FIG. 2.

A memory block having no data written therein, i.e. an erased memory block, may be defined as an empty block, and an erased block may include empty pages. A memory block having data written therein may be defined as a used block. The used block may include one or more of valid pages in which valid data are stored and one or more invalid pages in which invalid data are stored. Among used memory blocks, a memory block selected as the target of the garbage collection operation, i.e. a memory block on which garbage collection is to be performed, may be defined as a victim block. A block into which data stored in a valid page of the victim block is to be backed up by the garbage collection operation may be defined as a target block Blk_T.

The embodiment shown in FIG. 4 is based on the supposition that the memory blocks Blk0 and Blk1 are set to victim blocks. Among pages PG0 to PG3 of the victim memory block Blk0, data of the valid page PG3 may be copied into an empty page PG0 of the target block Blk_T. Also, among the pages PG0 to PG3 of the victim memory block Blk1, data of the valid pages PG0 and PG1 may be copied into empty pages PG1 and PG2 of the target block Blk_T, respectively. After data of the valid pages are copied, the victim blocks Blk0 and Blk1 may be erased and changed to empty blocks.

Data corresponding to logical addresses included in the logical address group LAG0 may be stored in all of the pages PG0 to PG3 of the memory block Blk0, and data corresponding to logical addresses included in the logical address group LAG3 and the logical address group LAG2 may be stored in the pages PG0 to PG3 of the memory block Blk1, respectively. At this time, when a garbage collection operation GC is performed, the valid data stored in the page PG3 of the memory block Blk0 and the valid data stored in the pages PG0 and PG1 of the memory block Blk1 may be backed up into the target block Blk_T. As a result, the valid data corresponding to the logical addresses included in the logical address group LAG0 and the logical address group LAG3 may be stored in the respective pages PG0 to PG2 of the target block Blk_T.

Since the garbage collection operation GC accompanies an operation of writing a valid page of a victim block into the target block Blk_T and an operation of erasing the victim block, the garbage collection operation GC may significantly consume the resource of the controller, and require a long operation time. In particular, when a plurality of host devices share the memory system and data having different workload characteristics (for example, data requested from different host devices) are stored in the same memory block, the data stored in the same memory block may be updated at different times, which makes it possible to increase the possibility that valid data and invalid data coexist. Therefore, the number of victim blocks for the garbage collection operation GC may be increased, the number of times that the garbage collection operation GC is performed may be increased, and the time required for performing the garbage collection operation GC may be increased. Thus, the performance of the system may be degraded.

When the period in which the garbage collection operation GC performs and the time required for the garbage collection operation GC are optimized, the operating speed of the memory system can be improved. Alternatively, when the amount or throughput of the garbage collection operation GC is optimized, the operating speed of the memory system can be improved.

Figure 5:
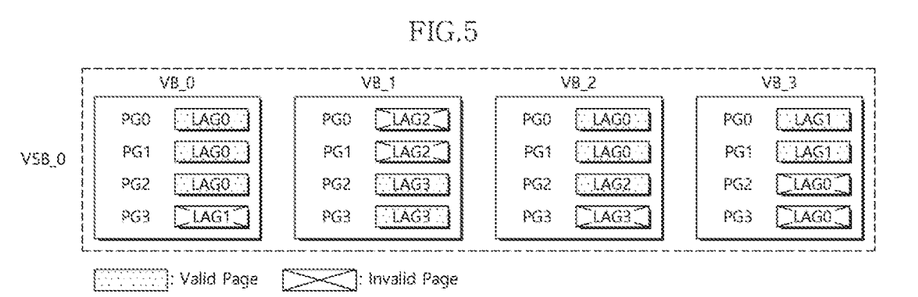
FIG. 5 illustrates a victim block in which valid data corresponding to a plurality of logical address groups are stored.

FIG. 5 illustrates victim blocks in which valid data corresponding to a plurality of logical address groups are stored.

In an embodiment, a victim block as the target of an internal backup operation and a target block into which valid data of the victim block are backed up may be set in unit of a super block including a plurality of memory blocks. The super block may be formed across a plurality of nonvolatile memory devices. The super block may be configured as one or more memory blocks included in each of the nonvolatile memory devices.

Hereafter, suppose that the victim block and the target block are described on a super block basis, each of the victim block and the target block includes four memory blocks, and each of the memory blocks includes four pages PG0 to PG3.

Referring to FIGS. 1 and 5, a victim super block VSB_0 may include four victim memory blocks VB_0 to VB_3, and data may be stored in all of the pages PG0 to PG3 included in each of the victim memory blocks VB_0 to VB_3. Valid data may indicate the latest data corresponding to a logical address. That is, when a plurality of data corresponding to a specific logical address are stored in the nonvolatile memory device 200, the last stored data may become valid data, and the other data excluding the valid data may be defined as invalid data. In an embodiment, the controller 100 may acquire information on whether the data stored in the victim block are valid data or invalid data, by referring to the mapping table MPT stored in the RAM 120 or the nonvolatile memory device 200.

In the victim memory block VB_0, valid data corresponding to logical addresses included in the logical address group LAG0 may be stored in three pages PG0, PG1 and PG2, and in the victim memory block VB_1, valid data corresponding to logical addresses included in the logical address group LAG3 may be stored in two pages PG2 and PG3. Also, in the victim memory block VB_2, valid data corresponding to logical addresses included in the logical address group LAG0 may be stored in two pages PG0 and PG1, and valid data corresponding to a logical address included in the logical address group LAG2 may be stored in the page PG2. In the victim memory block VB_3, valid data corresponding to logical addresses included in the logical address group LAG1 may be stored in two pages PG0 and PG1.

The valid data may be stored in 10 pages among the pages included in the victim super block VSB_0 corresponding to the target of the internal backup operation, and the numbers of valid data corresponding to the logical address groups LAG0 to LAGS may be 5, 2, 1 and 2, respectively. Then, the 10 valid data may be stored in a specific region of the target block during a subsequent internal backup operation (for example, garbage collection).

Figure 6:
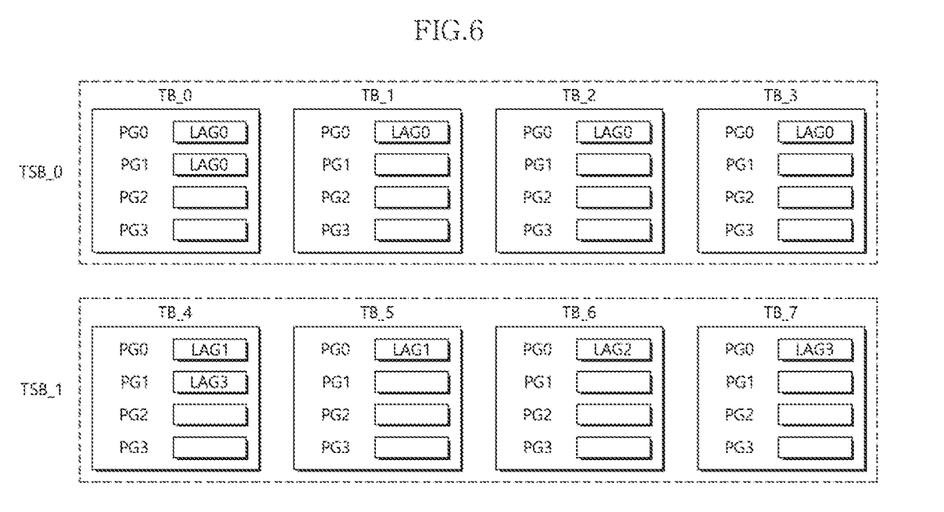
FIG. 6 is a diagram for describing the case in which the valid data stored in the victim block of FIG. 5 are backed up into two target blocks, in accordance with an embodiment.
Figure 7:
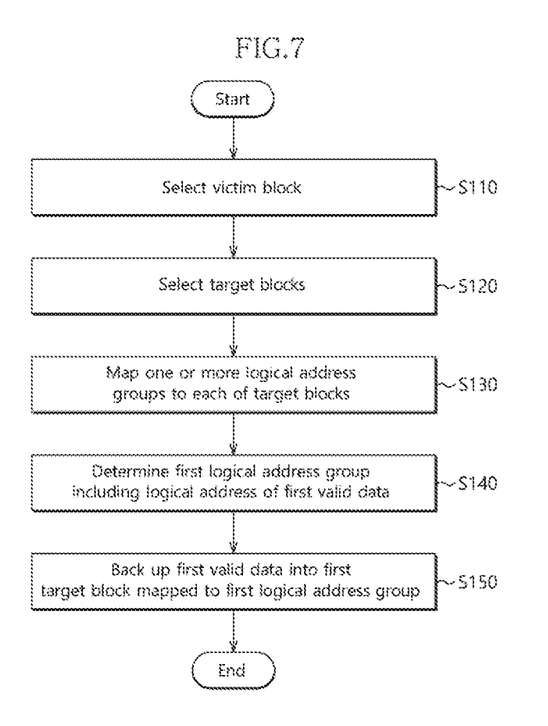
FIG. 7 is a flowchart for describing the embodiment of FIG. 6.

FIG. 6 is a diagram for describing the case in which the valid data stored in the victim super block VSB_0 of FIG. 5 are backed up into two target super blocks TSB_0 and TSB_1, in accordance with an embodiment. FIG. 7 is a flowchart for describing the embodiment of FIG. 6. Hereafter, referring to FIGS. 1, 5 and 7, the process of storing valid data in two target super blocks TSB_0 and TSB_1 in accordance with the present embodiment will be described.

At step S110, the control component 110 may select the victim super block VSB_0 of FIG. 5. The victim super block VSB_0 may be set in unit of super blocks including four memory blocks VB_0 to VB_3. Valid data may be stored in 10 pages of the victim super block VSB_0, as exemplified in FIG. 5.

At step S120, the control component 110 may select the target super blocks TSB_0 and TSB_1 of FIG. 6. Each of the target super blocks TSB_0 and TSB_1 may be set in unit of a super block including four memory blocks TB_0 to TB_3 and TB_4 to TB_7.

At step S130, the control component 110 may map one or more logical address groups of the logical address groups LAG0 to LAG3 to each of the target super blocks TSB_0 and TSB_1.

For example, the control component 110 may map, to the target super block TSB_0, the logical address group LAG0 including the largest number of logical addresses corresponding to the valid data stored in the victim super block VSB_0 among the logical address groups LAG0 to LAG3. The control component 110 may map the remaining logical address groups LAG1 to LAG3 to the remaining target super block TSB_1.

At step S140, the control component 110 may determine, among the logical address groups LAG0 to LAG3, a first logical address group including the logical address of first valid data stored in the victim super block VSB_0.

At step S150, the control component 110 may back up the first valid data into a first target block mapped to the first logical address group between the target super blocks TSB_0 and TSB_1. Therefore, the control component 110 may back up the valid data corresponding to the logical address group LAG0 into the target super block TSB_0, and back up the valid data corresponding to the logical address groups LAG1 to LAG3 into the target super block TSB_1.

In an embodiment related to step S130, the control component 110 may map one or more logical address groups to each of the target super blocks TSB_0 and TSB_1, according to offset values of the logical address groups LAG0 to LAG3. For example, the control component 110 may map one or more logical address groups to each of the target super blocks TSB_0 and TSB_1, according to whether the offset values of the logical address groups are odd or even. For example, the control component 110 may map the logical address groups LAG1 and LAG3 having odd offset values to the target super block TSB_0, and map the logical address groups LAG0 and LAG2 having even offset values to the target super block TSB_1.

In accordance with the present embodiment, the efficiency of the internal backup operation of the nonvolatile memory device 200 can be improved. In particular, when data corresponding to the same logical address group are gathered in the same target block in the case that a plurality of host devices share the memory system 10, the number of instances in which data having different workload characteristics are stored in the same memory block may be decreased while the possibility that the data stored in the same memory block will be updated at similar times is increased. Therefore, the possibility that valid data and invalid data will coexist in the memory block is decreased. As a result, the number of times that the internal backup operation (for example, the garbage collection operation) is performed can be reduced while the time required for performing the internal backup operation is shortened.

Figure 8:
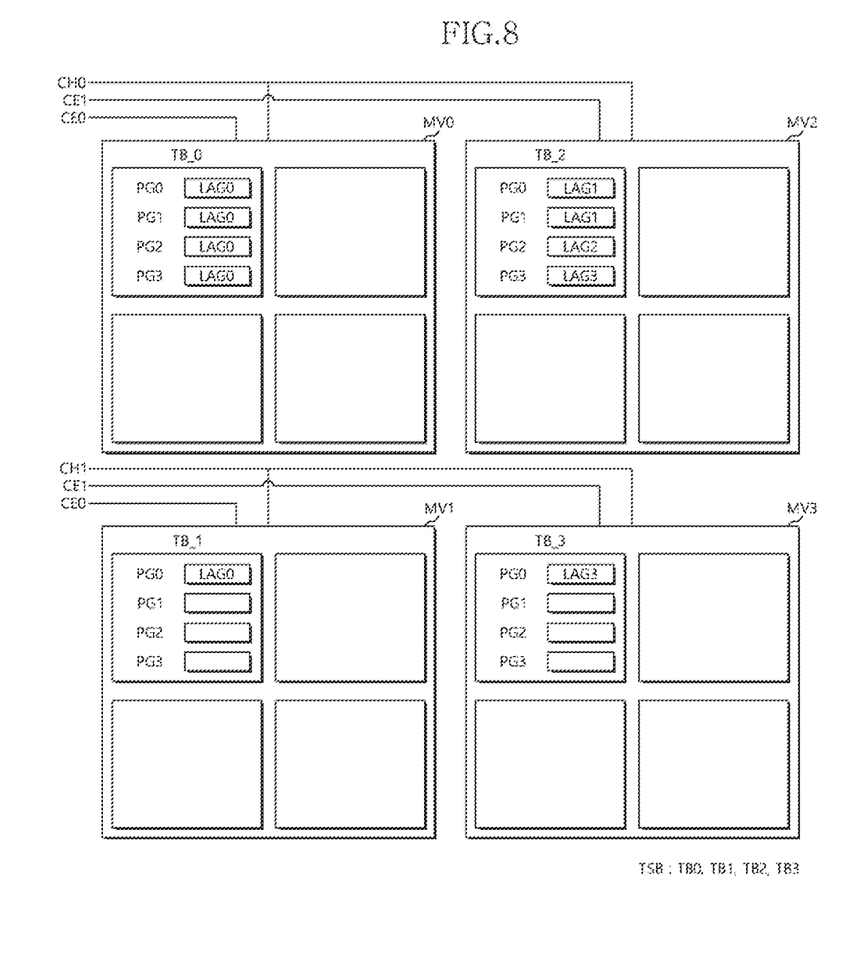
FIG. 8 is a diagram for describing the case in which the valid data stored in the victim block of FIG. 5 are backed up into one target block, in accordance with an embodiment.
Figure 9:
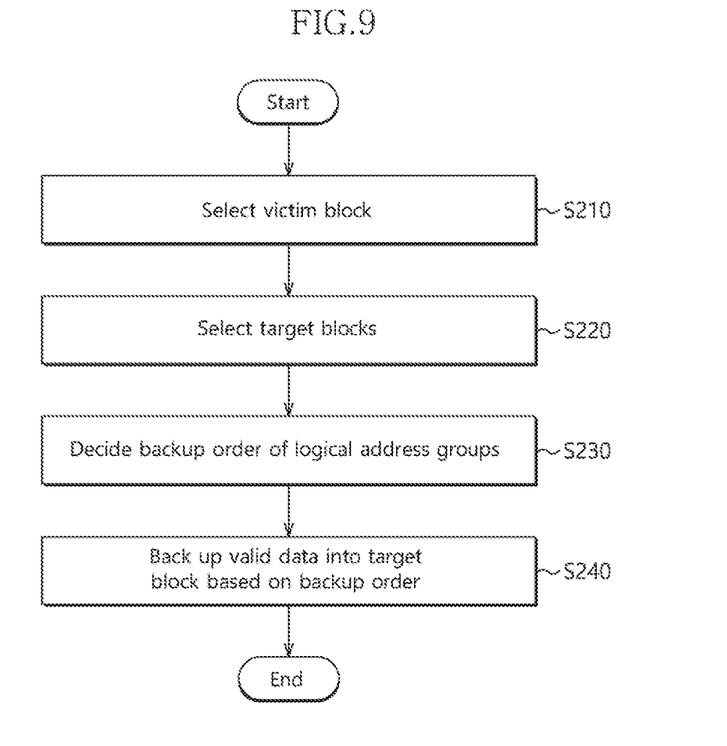
FIG. 9 is a flowchart for describing the embodiment of FIG. 8.

FIG. 8 is a diagram for describing a case in which the valid data stored in the victim super block VSB_0 of FIG. 5 are backed up into one target super block TSB, in accordance with an embodiment. FIG. 9 is a flowchart for describing the embodiment of FIG. 8. Hereafter, referring to FIGS. 1, 5, 8 and 9, the process of storing valid data in one target super block TSB in accordance with the present embodiment will be described.

In an embodiment, the control component 110 may set one super block TSB to a target block during an internal backup operation of data. That is, the super block TSB including four memory blocks TB_0 to TB_3 may be set to a target block. FIG. 8 is based on the supposition that the four target memory blocks TB_0 to TB_3 included in the target super block TSB are positioned in different nonvolatile memory devices MV0 to MV3. The target memory blocks TB_0 and TB_2 may be positioned in nonvolatile memory devices MV0 and MV2 between which commands and data are transferred/received through a channel CH0, and the target memory blocks TB_1 and TB_3 may be positioned in nonvolatile memory devices MV1 and MV3 between which commands and data are transferred/received through a channel CH1. Furthermore, suppose that the nonvolatile memory devices MV0 and MV1 are driven by a chip enable signal CE0, and the nonvolatile memory devices MV2 and MV3 are driven by a chip enable signal CE1. At this time, the chip enable signal CE0 may be first enabled between the chip enable signals CE0 and CE1 for driving the target super block TSB.

At step S210, the control component 110 may select the victim super block VSB_0.

At step S220, the control component 110 may select the target super block TSB into which valid data stored in the victim super block VSB_0 are to be backed up, among empty super blocks.

At step S230, the control component 110 may decide a backup order of the logical address groups LAG0 to LAG3. The backup order may indicate the order in which valid data corresponding to the respective logical address groups LAG0 to LAG3 are backed up into the target super block TSB.

Specifically, the control component 110 may select a first region into which valid data is to be first backed up, among a plurality of regions constituting the target super block TSB, and select a first logical address group to be mapped to the first region, among the logical address groups LAG0 to LAG3. That is, the first logical address group may be the highest in the backup order. Furthermore, the control component 110 may select a second region among the plurality of regions constituting the target super block TSB, and select a second logical address group to be mapped to the second region among the logical address groups excluding the first logical address group. That is, the second logical address group may be lower than the first logical address group in the backup order. In an embodiment, the second logical address group may include logical address groups other than the first logical address group among the logical address groups LAG0 to LAG3.

In an embodiment, the first region may be driven by the first chip enable signal CE0, and the second region may be driven by the second chip enable signal CE1. That is, the first and second regions may be selected so as to be driven by different chip enable signals CE0 and CE1. The first chip enable signal CE0 may be first enabled between the chip enable signals CE0 and CE1 for driving the target super block TSB.

For example, the control component 110 may select the target memory blocks TB_0 and TB_1 as the first region into which valid data are to be first backed up, among the target memory blocks TB_0 to TB_3 constituting the target super block TSB. Since the target memory blocks TB_0 and TB_1 are driven by the chip enable signal CE0 which is first enabled between the chip enable signals CE0 and CE1, the target memory blocks TB_0 and TB_1 may be selected as the first region. Furthermore, the control component 110 may select the logical address group LAG0 as the first logical address group to be mapped to the target memory blocks TB_0 and TB_1, among the logical address groups LAG0 to LAG3. The logical address group LAG0 may be the logical address group including the largest number of logical addresses corresponding to the valid data stored in the victim super block VSB_0, among the logical address groups LAG0 to LAG3. As a result, the control component 110 may map the logical address group LAG0 to the target memory blocks TB_0 and TB_1.

In another embodiment, the control component 110 may select a logical address group having a preset offset value as the first logical address group, among the logical address groups LAG0 to LAG3.

The control component 110 may select the target memory blocks TB_2 and TB_3 of the target memory blocks TB_0 to TB_3 as the second region lower than the first region in the backup order. The target memory blocks TB_2 and TB_3 may be driven by the chip enable signal CE1. The control component 110 may select the logical address groups LAG1 to LAG3 as the second logical address group to be mapped to the target memory blocks TB_2 and TB_3. The control component 110 may map the logical address groups LAG1 to LAG3 to the target memory blocks TB_2 and TB_3.

At step S240, the control component 110 may back up selected valid data of the valid data stored in the victim super block VSB_0 into the target super block TSB, based on the backup order. The control component 110 may back up the valid data corresponding to the logical address group LAG0 into the target memory blocks TB_0 and TB_1, and back up the valid data corresponding to the logical address groups LAG1 to LAG3 into the target memory blocks TB_2 and TB_3, according to the mapping information of step S230.

In accordance with the present embodiment, the efficiency of the internal backup operation of the nonvolatile memory device 200 can be improved. In particular, when data corresponding to logical addresses included in the same logical address group are gathered in the same region (for example, a region driven by the same chip enable signal) in the case that a plurality of host devices share the memory system 10, the number of cases in which data having different workload characteristics are stored in the same memory block can be reduced while the possibility that the data stored in the same memory block will be updated at similar times is increased. Therefore, the possibility that valid data and invalid data will coexist in a memory block may decrease. As a result, the number of times that the internal backup operation is performed can be reduced, and the time required for performing the internal backup operation can be shortened, which makes it possible to improve the performance of the system.

Figure 10:
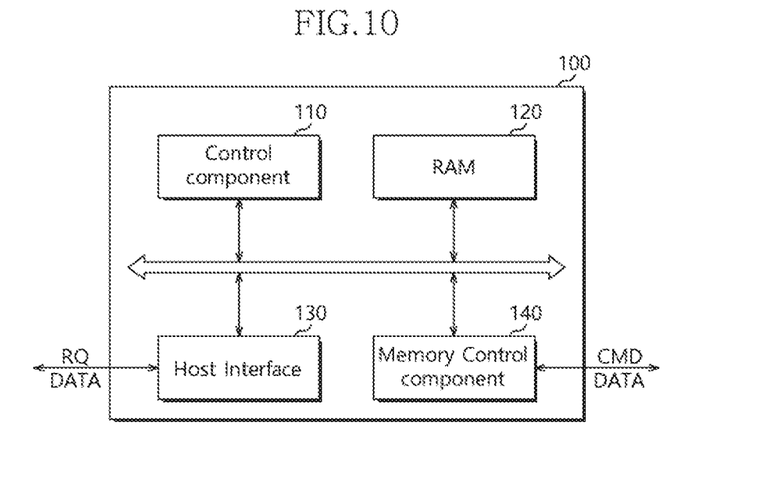
FIG. 10 is a block diagram illustrating the configuration of a controller in accordance with an embodiment.

FIG. 10 is a block diagram illustrating the configuration of a controller in accordance with an embodiment.

Referring to FIGS. 1 and 10, the controller 100 in accordance with the present embodiment may include a control component 110, a RAM 120, a host interface 130 and a memory control component 140. In an embodiment, the controller 100, the control component 110, and the RAM 120 may correspond to the controller 100, the control component 110, and the RAM 120 of FIG. 1, respectively. Therefore, detailed explanations will be omitted.

The host interface 130 may interface the host devices 20 and the memory system 10. For example, the host interface 130 may communicate with the host devices 20 using a host interface which corresponds to any one of standard transfer protocols such as secure digital, USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage).

The memory control component 140 may control the nonvolatile memory device 200 under control of the control component 110. The memory control component 140 may also be referred to as a memory interface. The memory control component 140 may provide control signals to the nonvolatile memory device 200. The control signals may include a command, address and control signal for controlling the nonvolatile memory device 200. The memory control component 140 may provide data to the nonvolatile memory device 200, or receive data from the nonvolatile memory device 200.

Figure 11:
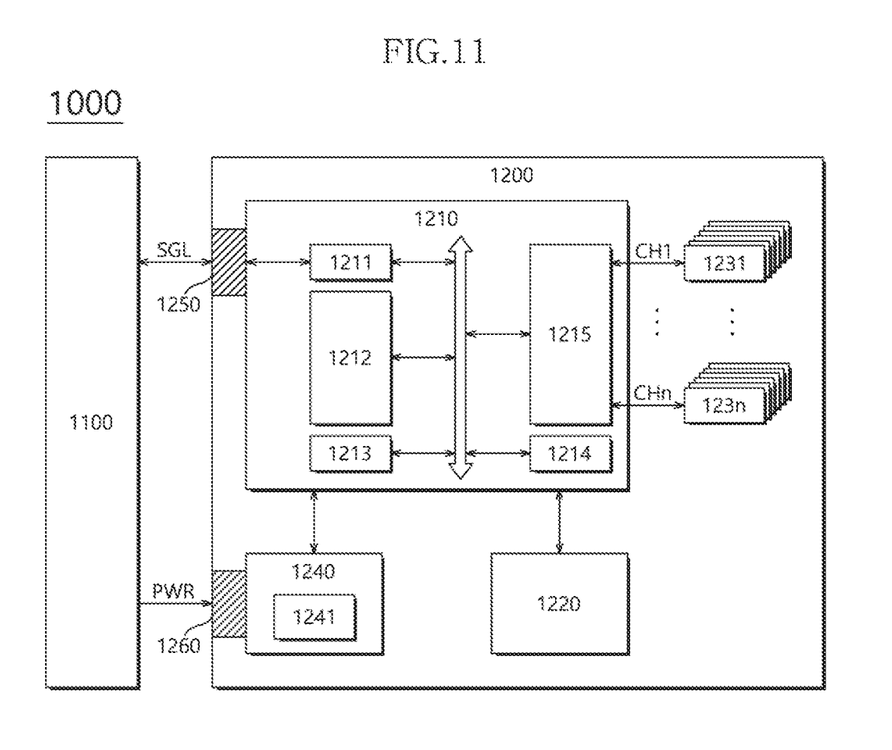
FIG. 11 is a diagram illustrating a data processing system including a solid state drive (SSD) in accordance with an embodiment.

FIG. 11 is a diagram illustrating a data processing system 1000 including a solid state drive (SSD) 1200 in accordance with an embodiment. Referring to FIG. 11, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260. In an embodiment, the controller 1210 and the nonvolatile memory devices 1231 may correspond to the controller 100 and the nonvolatile memory devices 200 of FIG. 1, respectively.

The controller 1210 may control general operations of the SSD 1200. The controller 1210 may include a host interface 1211, a control component 1212, a random access memory 1213, an error correction code (ECC) component 1214, and a memory interface 1215. In an embodiment, the control component 1212 and the random access memory 1213 may correspond to the control component 110 and the RAM 120 of FIG. 1, respectively. The memory interface 1215 may correspond to the memory control component 140 of FIG. 10.

The host interface 1211 may exchange a signal SGL with the host device 1100 through the signal connector 1250. The signal SGL may include a command, an address, data, and so forth. The host interface 1211 may interface the host device 1100 and the SSD 1200 according to the protocol of the host device 1100. For example, the host interface 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (DATA), serial advanced technology attachment (SATA), small computer system interface (SCSI), serial attached SCSI (SAS), peripheral component interconnection (PCI), PCI express (PCI-E) and universal flash storage (UFS).

The control component 1212 may analyze and process the signal SGL received from the host device 1100. The control component 1212 may control operations of internal function blocks according to a firmware or a software for driving the SSD 1200. The random access memory 1213 may be used as a working memory for driving such a firmware or software.

The ECC component 1214 may generate the parity data of data to be transmitted to at least one of the nonvolatile memory devices 1231 to 123n. The generated parity data may be stored together with the data in the nonvolatile memory devices 1231 to 123n. The ECC component 1214 may detect an error of the data read from at least one of the nonvolatile memory devices 1231 to 123n, based on the parity data. If a detected error is within a correctable range, the ECC component 1214 may correct the detected error.

The memory interface 1215 may provide control signals such as commands and addresses to at least one of the nonvolatile memory devices 1231 to 123n, according to control of the control component 1212. Moreover, the memory interface 1215 may exchange data with at least one of the nonvolatile memory devices 1231 to 123n, according to control of the control component 1212. For example, the memory interface 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 12:
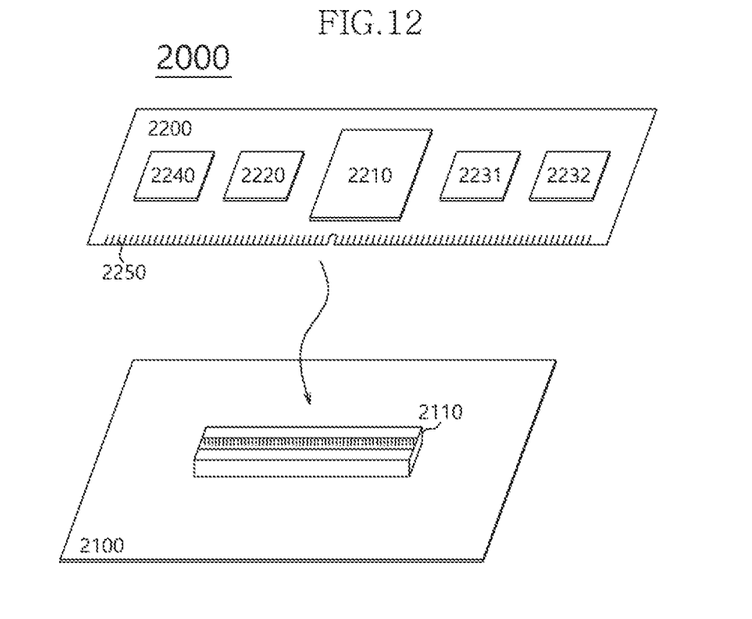
FIG. 12 is a diagram illustrating a data processing system including a memory system in accordance with an embodiment.

FIG. 12 is a diagram illustrating a data processing system 2000 including a memory system 2200 in accordance with an embodiment. Referring to FIG. 12, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 11.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 13:
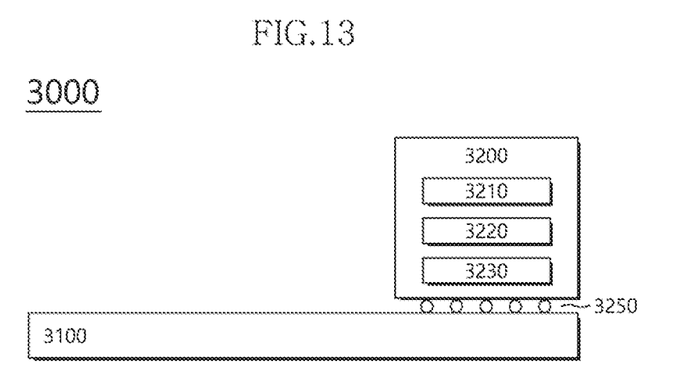
FIG. 13 is a diagram illustrating a data processing system including a memory system in accordance with an embodiment.

FIG. 13 is a diagram illustrating a data processing system 3000 including a memory system 3200 in accordance with an embodiment. Referring to FIG. 13, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 11.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 14:
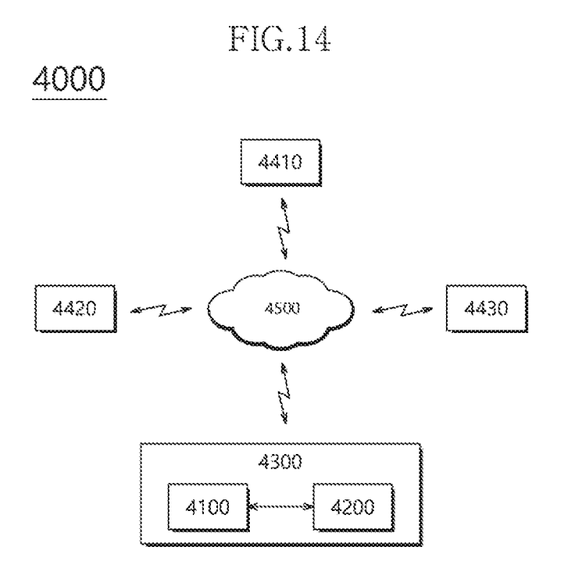
FIG. 14 is a diagram illustrating a network system including a memory system in accordance with an embodiment.

FIG. 14 is a diagram illustrating a network system 4000 including a memory system 4200 in accordance with an embodiment. Referring to FIG. 14, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 10 shown in FIG. 1, the memory system 1200 shown in FIG. 11, the memory system 2200 shown in FIG. 12 or the memory system 3200 shown in FIG. 13.

FIG. 15 is a block diagram illustrating a nonvolatile memory device 300 included in a memory system in accordance with an embodiment. Referring to FIG. 15, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the operating method and the memory system which are described herein should not be limited based on the described embodiments.

What is claimed is:

1. An operating method of a memory system, the operation method comprising:
dividing a plurality of logical addresses to be transmitted from a plurality of host devices having different workload characteristics, into a plurality of logical address groups according to the workload characteristics, a first logical address group and a second logical address group of the logical address groups being respectively used by a first host device and a second host device having different workload characteristics;
selecting a victim block in which valid data is stored;
selecting a first target block and a second target block among empty blocks;
mapping the first logical address group to the first target block and mapping the second logical address group to the second target block;
referring to a mapping table stored in a memory, the mapping table having information on which logical address group includes a logical address of the valid data and information between a physical address indicating a position where the valid data is stored in the victim block and the logical address of the valid data;
determining first valid data corresponding to a first logical address included in the first logical address group and second valid data corresponding to a second logical address included in the second logical address group among the valid data based on the mapping table; and
backing up the first valid data into the first target block and the second valid data into the second target block.

2. The operating method according to claim 1, wherein the first logical address group includes the largest number of logical addresses corresponding to the valid data stored in the victim block, among the logical address groups.

3. The operating method according to claim 1, wherein the first logical address group and the second logical address group are determined according to offset values of the logical address groups.

4. The operating method according to claim 1, wherein each of the victim block and the first and second target blocks is set in a super block basis including a plurality of memory blocks respectively included in a plurality of nonvolatile memory devices included in the memory system.

5. An operating method of a memory system, the operation method comprising:
dividing a plurality of logical addresses to be transmitted from a plurality of host devices having different workload characteristics, into a plurality of logical address groups according to the workload characteristics, a first logical address group and a second logical address group of the logical address groups being respectively used by a first host device and a second host device having different workload characteristics;
selecting a victim block;
selecting a target block into which valid data stored in the victim block is to be backed up, among empty blocks;
referring to a mapping table stored in a memory, the mapping table having information on which logical address group includes a logical address of the valid data;
deciding a backup order of the logical address groups, the backup order indicating an order that valid data corresponding to the respective logical address groups are backed up into the target block; and
backing up first valid data corresponding to the first logical address group into a first region of the target block before backing up second valid data corresponding to the second logical address group into a second region of the target block according to the backup order,
wherein the first logical address group is a logical address group including the largest number of logical addresses corresponding to the valid data stored in the victim block, among the logical address groups.

6. The operating method according to claim 5, wherein the deciding of the backup order comprises:
selecting the first region among a plurality of regions constituting the target block; and
selecting the first logical address group to be mapped to the first region among the logical address groups.

7. The operating method according to claim 5,
wherein the first region is driven by a first chip enable signal,
wherein the second region is driven by a second chip enable signal, and
wherein the first chip enable signal is first enabled among chip enable signals for driving the target block.

8. The operating method according to claim 5, wherein the mapping table comprises mapping information between a physical address indicating a position where the valid data is stored in the victim block and the logical address of the valid data.

9. The operating method according to claim 5, wherein each of the victim block and the target block is set in a super block basis including a plurality of memory blocks respectively included in a plurality of nonvolatile memory devices included in the memory system.

10. A memory system comprising:
a plurality of nonvolatile memory devices each including a plurality of memory blocks; and
a controller configured to divide a plurality of logical addresses to be transmitted from a plurality of host devices having different workload characteristics, into a plurality of logical address groups according to the workload characteristics, group the memory blocks into a plurality of super blocks across the nonvolatile memory devices, select a victim super block among the super blocks, select one or more target super blocks among empty super blocks, and map at least one logical address group of the logical address groups to each of the target super blocks,
wherein the controller further refers to a mapping table stored in a memory, the mapping table having information on which logical address group includes a logical address of valid data stored in the victim super block, determines one or more logical address groups including one or more logical addresses corresponding to the valid data based on the mapping table, and backs up the valid data into the target super blocks mapped to the determined logical address groups.

11. The memory system according to claim 10, wherein the controller determines the logical address groups and backs up the valid data by:
determining a first logical address group including a logical address of first valid data stored in the victim super block, among the logical address groups, and
backing up the first valid data into a first target super block mapped to the first logical address group among the target super blocks.

12. The memory system according to claim 11, wherein the controller maps the at least one logical address group by:

deciding a logical address group including the largest number of logical addresses corresponding to the valid data stored in the victim block, among the logical address groups;

mapping the decided logical address group to any one target super block of the target super blocks; and mapping the other logical address groups excluding the decided logical address group among the logical address groups, to another target super block of the target super blocks.

13. The memory system according to claim 10, wherein the controller determines the logical address groups and backs up the valid data by:

selecting a first target super block among the target super blocks;

mapping at least one logical address group of the logical address groups to each of a plurality of regions which are included in the first target super block and respectively driven by different chip enable signals;

determining a first logical address group including a logical address of first valid data stored in the victim super block, among the logical address groups; and backing up the first valid data into a first region mapped to the first logical address group among the regions.

14. The memory system according to claim 13, wherein the controller maps the at least one logical address group by:

mapping the first logical address group to the first region; and mapping the other logical address groups excluding the first logical address group among the regions, to a second region, wherein the first logical address group includes the largest number of logical addresses corresponding to valid data stored in the victim block, among the logical address groups, and wherein the first region is driven by a chip enable signal which is first enabled among the chip enable signals.

15. The operating method according to claim 1, wherein, when the second logical address group is not mapped to the first target block, the second valid data is not able to be backed up to the first target block.

* * * * *